United States Patent Office 3,094,573
Patented June 18, 1963

3,094,573
PREPARATION OF METHYL PENTENES
Lewis W. Hall, Jr., Wilmington, Del., assignor to Sun Oil Company, Philadelphia, Pa., a corporation of New Jersey
No Drawing. Filed Apr. 13, 1961, Ser. No. 102,631
15 Claims. (Cl. 260—683.15)

This invention relates to the preparation of methyl pentenes by the dimerization of propylene under certain catalytic reaction conditions.

The catalytic polymerization of propylene ordinarily results in a mixture of polymerization products which vary considerably in molecular weight and which may range from liquid to solid polymers. It is unusual to find a catalyst system which is capable of forming propylene dimers (i.e. hexenes) as the major product. The dimerization product, which is essentially methyl pentenes, is desirable as high octane components of motor fuels, and also certain methyl pentenes, particularly 4-methylpentene-1, are useful as monomers for the production of polyolefin resins.

The present invention is directed to a method of polymerizing propylene under conditions whereby methyl pentenes are the major product of the reaction.

According to the invention, propylene is dimerized by contacting it with a catalyst system prepared by mixing an alkali metal, other than lithium, distended on an inert support with an organo metallic compound having the formula $R_2M$ wherein R is an alkyl group having 1–10 carbon atoms, phenyl or benzyl and M is mercury, zinc or cadmium. Contact of the propylene with the catalyst system can be carried out either in the presence or absence of an inert reaction medium such as pentane, heptane, octane, decane, benzene or any hydrocarbon solvent which is inert to the catalyst. The temperature of contact should be in the range of 100–250° C. and preferably 150–200° C. The operation can be conducted batchwise or in a flow reactor either with the hydrocarbons and catalyst both flowing therethrough or with the hydrocarbons passing through a bed of the supported catalyst. After separation of the hydrocarbon reaction product from the catalyst, the methyl pentenes can be recovered from the product by distillation.

Alkali metals, such as sodium and potassium, have been used heretofore to polymerize olefins under certain conditions. The catalyst system of the present invention, wherein the effective catalytic agent is the reaction product between the alkali metal and a metallohydrocarbon in which the metal is mercury, zinc or cadmium, has been found to be substantially more effective for converting propylene to methyl pentenes than the alkali metals themselves. For example, the present catalyst system will promote the dimerization of propylene under some conditions at which the alkali metal itself will effect essentially no conversion. Hence the present invention provides an improved catalyst system for dimerizing propylene. The dimerization product is composed of a mixture of methyl pentene isomers the proportions of which vary dependent upon the particular reaction conditions used. Short reaction times tend to favor the formation of 4-methylpentene-1 while longer reaction times tend to cause the formation of other methyl pentene isomers such as 2-methylpentene-2 and 4-methylpentene-2.

As previously stated, the metalloorganic compound used in forming the catalyst system has the formula $R_2M$, wherein R is an alkyl group of one to ten carbon atoms, a phenyl group or a benzyl group. In the case of alkyl groups the R substituent can correspond to any alkane ranging from methane through decanes and can be a primary, secondary or tertiary alkyl group, although primary alkyl groups are preferred. Examples are methyl, ethyl, n-propyl, isopropyl, isobutyl, tertiary butyl, hexyl, octyl, etc. A few specific examples of the organo metallic compounds are diethyl mercury, di-n-pentyl mercury, diisobutyl zinc, di-n-heptyl cadmium, diphenyl mercury and dibenzyl zinc. The molar ratio of the organo metallic compound to the alkali metal used can vary considerably but generally will be in the range of 5:1 to 1:5 and more preferably 1:1 to 1:3. The metal component of the organo metallic compound can be any alkali metal other than lithium, the latter being essentially inoperative for the present purpose.

In preparing the present catalyst system, the alkali metal is first dispersed on a support which is inert to the catalyst ingredients and perferably also which does not have any catalytic activity itself such as the ability to isomerize olefins. This can be done simply by mixing the metal at a temperature above its melting point with the support material in finely divided form. Examples of suitable support materials are alkali metal salts such as sodium chloride, sodium fluoride, potassium bromide, sodium carbonate, potassium sulfate, cesium bromide, rubidium fluoride, lithium iodide and the like, or finely divided glass or rock such as granite. After the metal has been thoroughly dispersed on the support, it is contacted with the organo metallic compound to form the desired catalytic system. This can be done conveniently by dissolving the organo metallic compound in an inert hydrocarbon solvent, such as heptane or benzene, and contacting the supported alkali metal with the solution at ambient temperature. Precautions should be taken in the catalyst preparation to exclude air and water from the system.

The following examples provide a comparison of the use of an alkali metal itself as catalyst versus use of the present catalyst system.

*Example I*

A sodium catalyst is prepared by thoroughly mixing 3.0 g. of molten sodium with 50 g. of dry NaCl having a mesh size of 100–230 (U.S. Sieve Series), and the mixture is introduced into a 300 ml. rocker bomb together with 50 ml. of dry n-heptane. Propylene is pressured into the bomb in amount of about 24 g. The bomb is heated to 200° C. and maintained at that temperature for 9 hours. Essentially no reaction is obtained as indicated by the pressure in the bomb remaining constant. This shows that under the reaction conditions used, supported sodium metal is ineffective as a catalyst for polymerizing propylene.

*Example II*

The bomb containing the mixture described in the preceding example is cooled to room temperature and vented to release the propylene. A solution of 3.0 ml. of diethyl mercury in 10 ml. of n-heptane is then added to the bomb, and propylene is then introduced in amount of about 24 g. The bomb is heated to 180° C. and maintained at that temperature for 7 hours, during which time reaction occurs as indicated by a substantial pressure drop. The bomb is then cooled to room temperature and volatile gases (mainly propylene) are vented. The remaining material is admixed with 50 ml. of methanol to destroy the catalyst, and the mixture is contacted with 890 ml. of water and allowed to stratify. The aqueous layer is washed twice with 25 ml. portions of n-heptane and the hydrocarbon washes are added to the hydrocarbon layer from the reaction mixture. The resulting product is distilled and 6.7 g. of hydrocarbon fraction boiling in the range of 50–90° C. is obtained. Analysis of this fraction by vapor phase chromatography shows the following composition:

| | Percent |
|---|---|
| 4-methylpentene-1 | 2.3 |
| 4-methylpentene-2 | 27.5 |
| 2-methylpentene-1 | 11.1 |
| 2-methylpentene-2 | 53.2 |
| Other hydrocarbons | 5.9 |

The data show that a substantial conversion of propylene to methyl pentenes can be effected by the catalyst system. It is apparent that in commercial practice the unreacted propylene could be recovered and recycled for further conversion.

Substantially similar results are obtained when the other alkali metals, other than lithium, are substituted for sodium or when other organo metallic derivatives of mercury, zinc or cadmium are substituted for diethyl mercury, although in such other cases different degrees of conversion and different distributions of the methyl pentene isomers may be obtained. Potassium is a particularly effective component of the catalyst for securing a higher degree of conversion of the propylene. When 4-methylpentene-1 is the desired hexene product, potassium, as well as cesium or rubidium, can be used with relatively short reaction times to improve the selectivity of the reaction for producing this particular isomer. Also the selectivity for producing this isomer can be increased by decreasing the amount of catalyst used or by reducing the contact time although these factors tend to reduce the overall conversion of propylene to dimers.

I claim:

1. Method of preparing methyl pentenes which comprises contacting propylene at a temperature in the range of 100 to 250° C. with a catalyst system prepared by admixing an alkali metal, selected from the group consisting of sodium, potassium, rubidium and cesium, distended on an inert support with an organo metallic compound having the formula $R_2M$ wherein R is selected from the group consisting of alkyl groups having 1–10 carbon atoms, phenyl and benzyl, and M is a metal selected from the group consisting of mercury, zinc and cadmium, the molar ratio of organo metallic compound to alkali metal being in the range of 5:1 to 1:5.

2. Method according to claim 1 wherein the molar ratio of said organo metallic compound to the alkali metal is in the range of 1:1 to 1:3.

3. Method according to claim 2 wherein said temperature is in the range of 150–200° C.

4. Method according to claim 1 wherein said temperature is in the range of 150–200° C.

5. Method according to claim 1 wherein M is mercury.

6. Method according to claim 5 wherein R is an ethyl radical.

7. Method according to claim 1 wherein R is an alkyl group.

8. Method according to claim 7 wherein said temperature is in the range of 150–200° C.

9. Method according to claim 8 wherein M is mercury.

10. Method according to claim 9 wherein R is an ethyl radical.

11. Method of preparing methyl pentenes which comprises contacting propylene at a temperature in the range of 100 to 250° C. with a catalyst system prepared by admixing sodium distended on an inert support with an organo metallic compound having the formula $R_2M$ wherein R is selected from the group consisting of alkyl groups having 1–10 carbon atoms, phenyl and benzyl, and M is a metal selected from the group consisting of mercury, zinc, and cadmium, the molar ratio of organo metallic compound to sodium being in the range of 5:1 to 1:5.

12. Method in accordance with claim 11 wherein the molar ratio of the organo metallic compound to sodium is in the range of 1:1 to 1:3.

13. Method according to claim 12 wherein the temperature is in the range of 150–200° C.

14. Method according to claim 11 wherein M is mercury.

15. Method according to claim 14 wherein R is an ethyl radical.

References Cited in the file of this patent

UNITED STATES PATENTS

| | | |
|---|---|---|
| 2,117,022 | Cramer | May 10, 1938 |
| 2,401,922 | Frey et al. | June 11, 1946 |
| 2,450,451 | Schmerling | Oct. 5, 1948 |
| 2,548,803 | Little | Apr. 10, 1951 |
| 2,881,234 | Esmay et al. | Apr. 7, 1959 |
| 2,986,588 | Schramm | May 30, 1961 |
| 3,009,972 | Johnson | Nov. 21, 1961 |